United States Patent
Schwarz

[15] 3,675,561
[45] July 11, 1972

[54] PHOTOGRAPHIC CAMERA WITH FOCAL PLANE SHUTTER AND INTERCHANGEABLE OBJECTIVE SHUTTER

[72] Inventor: Gerhard Schwarz, Munich, Germany

[73] Assignee: Compur-Werk Gesellschaft mit beschrankter Haftung & Co., Munich, Germany

[22] Filed: April 7, 1971

[21] Appl. No.: 131,872

[30] Foreign Application Priority Data

April 9, 1970  Germany ............... P 20 17 032.5

[52] U.S. Cl. ............... 95/53 E, 95/53 EB, 95/59, 95/63
[51] Int. Cl. .................................................. G03b 9/00
[58] Field of Search ............... 95/53 E, 53 EA, 53 EB, 53, 95/55, 58, 59, 62, 63

[56] References Cited

UNITED STATES PATENTS

| 2,708,395 | 5/1955 | Wagner et al. | 95/63 UX |
| 3,502,014 | 3/1970 | Atake | 95/53 EB |

Primary Examiner—Samuel S. Matthews
Assistant Examiner—Robert P. Grenier
Attorney—Charles Shepard and Stonebreaker & Shepard

[57] ABSTRACT

A photographic camera having a focal plane shutter and also having an interchangeable objective unit including an objective shutter, together with electronic control means for controlling the operations of both shutters. A simple change-over switch enables the user to select which of the two shutters will be effective to control any particular exposure. The camera may also be used with a simple objective unit not having an objective shutter therein, and in that case an interlock insures that the change-over switch will be set for effective operation of the focal plane shutter.

13 Claims, 15 Drawing Figures

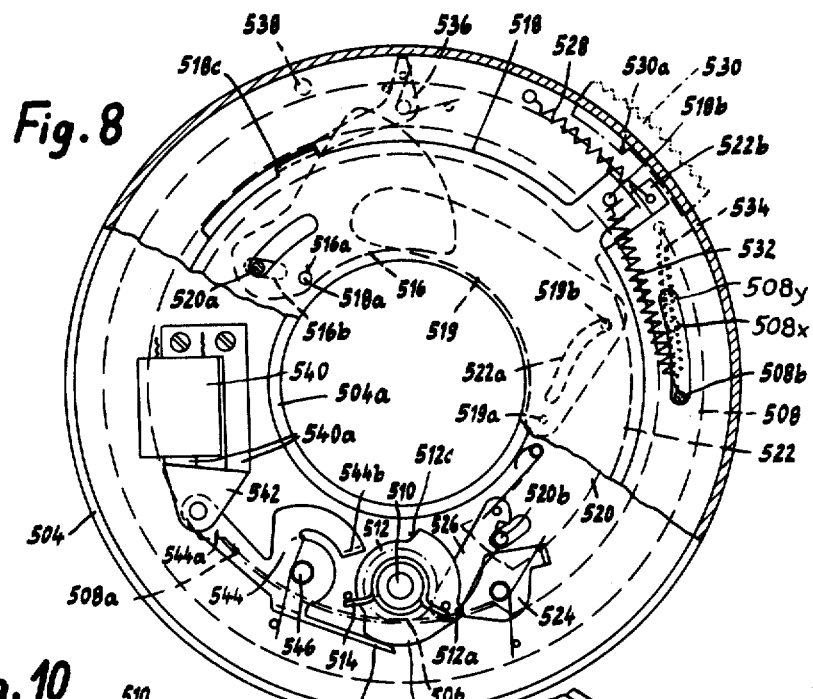
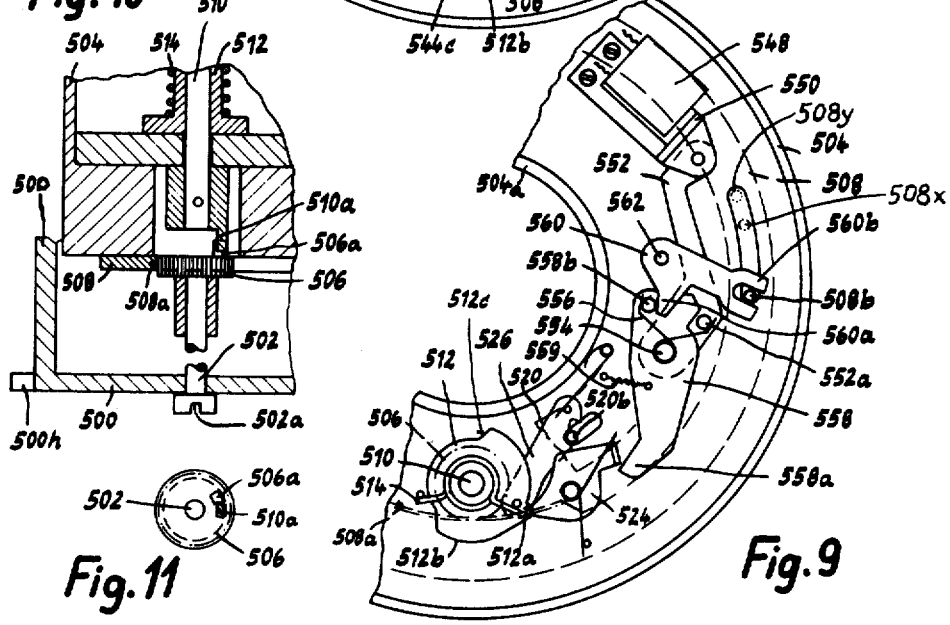

PHOTOGRAPHIC CAMERA WITH FOCAL PLANE SHUTTER AND INTERCHANGEABLE OBJECTIVE SHUTTER

BACKGROUND OF THE INVENTION

This invention relates to a photographic camera having two shutters of two different types, namely, a focal plane shutter permanently built into the camera and present in the camera during the making of all exposures, and an objective shutter preferably incorporated in an objective unit or lens unit which is detachably and interchangeably mounted on the camera. Depending upon the prevailing photographic conditions either shutter may be used for controlling any particular exposure, the other shutter being wide open, of course, during the making of the exposure by the selected shutter. Conveniently, but not necessarily, the focal plane shutter may be chosen for making the exposure in ordinary daylight photographs, and the objective shutter may be used for special purposes, such as the making of flashlight pictures.

It has previously been proposed to operate the focal plane shutter and the objective shutter from a common control arrangement of the camera, and to use a manually operable opening member, in addition to a selector switch, to keep the objective shutter continuously open if the exposure is to be performed with the focal plane shutter, or to keep the focal plane shutter continuously open if the exposure is to be performed with the objective shutter. This prior arrangement is not satisfactory, however, not only because it needs mechanical connections which are relatively expensive, but also because it has the functional disadvantage that there is no certainty that both the selector switch and the shutter opening member will be brought into a co-ordinated position, so that faulty exposures are frequently experienced. Thus for example, with the prior arrangement, the user may remove the objective unit or lens unit which has an objective shutter built into it, and may substitute a simple or normal objective unit having no shutter built therein; then when he uses the camera he may forget that the objective unit mounted on the camera has no shutter in it, and he may set the camera mechanism for taking a picture by means of the objective shutter, with the result that the focal plane shutter will not perform the exposure function at all or will not do so in the correct sequence, when no objective shutter is present.

An object of the present invention is to overcome these drawbacks and to provide a selector arrangement on the camera which is reliable in its operation and requires a minimum of constructional parts.

Another object is to provide a camera so designed that when any particular shutter is selected for performing the exposure function, both shutters will properly complete their individual operating cycles, and if no objective shutter is present on the camera, the focal plane shutter will operate properly to make the exposure.

Still another object is the provision of a camera having a relatively simple electronic control arrangement adjustable by a change-over or selector switch so as to control the operating cycles of the built-in focal plane shutter and of the interchangeable objective shutter (if one is present), with adequate interlocking safeguards to insure that the focal plane shutter will properly control the exposure if no objective shutter is present.

A further object of the invention is the provision of a camera of this kind, equipped with a movable selector member in the form of a manually operable setting knob which is coupled to the change-over switch and which is easily shiftable at will into a position for exposure through the focal plane shutter, or a position for exposure through the objective shutter when an objective shutter is present.

A still further object of the invention is the provision, in a camera of the kind just mentioned, of means on a normal or simple interchangeable objective or lens unit (that is, an objective unit which does not have an objective shutter therein) cooperating with coacting means on the camera in such a way that when a normal or simple objective unit is placed on the camera, it will automatically shift the setting knob and change-over switch to a position for exposure through the focal plane shutter, if the setting knob and the switch were previously in the position for exposure through an objective shutter.

Another object is the provision of simplified electronic circuitry including Schmitt trigger devices equipped with RC members and including holding magnets, the armatures of which constitute function blocking means for the individual operating cycles.

Still another object is the provision of such electronic control circuitry including a simple arrangement in which the holding magnets constituting the function blocking means of the interchangeable objective shutter are arranged within this shutter and are conductively connected to other parts of the circuit through releasable connection contacts, when the objective shutter is mounted on the camera.

A construction fulfilling the objects above mentioned enables a selector arrangement of the character concerned to be applied to the camera with a notable absence of complication, even when the camera is of the mirror reflect type having a swinging mirror movable between a viewing position and a picture-taking or exposure position, in that the function blocking is performed by the electrical circuitry in such a way that before each exposure, with the mirror in viewing or observation position, the focal plane shutter is closed and the interchangeable objective shutter is open, and after the mechanism is tripped or released, the two shutters respectively run down through their functional positions in their individual operating cycles, the sequence of the various movements being controlled by the electrical circuitry so that one shutter remains open while the other shutter opens and closes to control the exposure.

BRIEF DESCRIPTION OF THE DRAWINGS

FIG. 8 is a plan of the objective shutter, with parts broken away and parts omitted and some parts shown schematically;

FIG. 9 is a view similar to a fragment of FIG. 8, showing additional parts of the objective shutter;

FIG. 10 is a section showing certain details of the objective shutter and associated parts;

FIG. 11 is a fragmentary section through certain parts shown in FIG. 10, illustrating additional details;

DESCRIPTION OF THE PREFERRED EMBODIMENT

Figure 2:
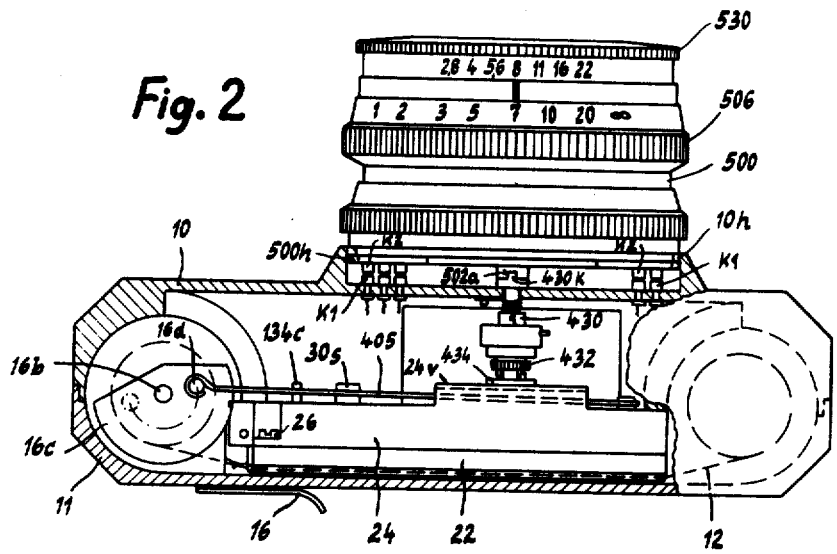
FIG. 2 is a section taken approximately on the line II—II of FIG. 1.
Figure 1:
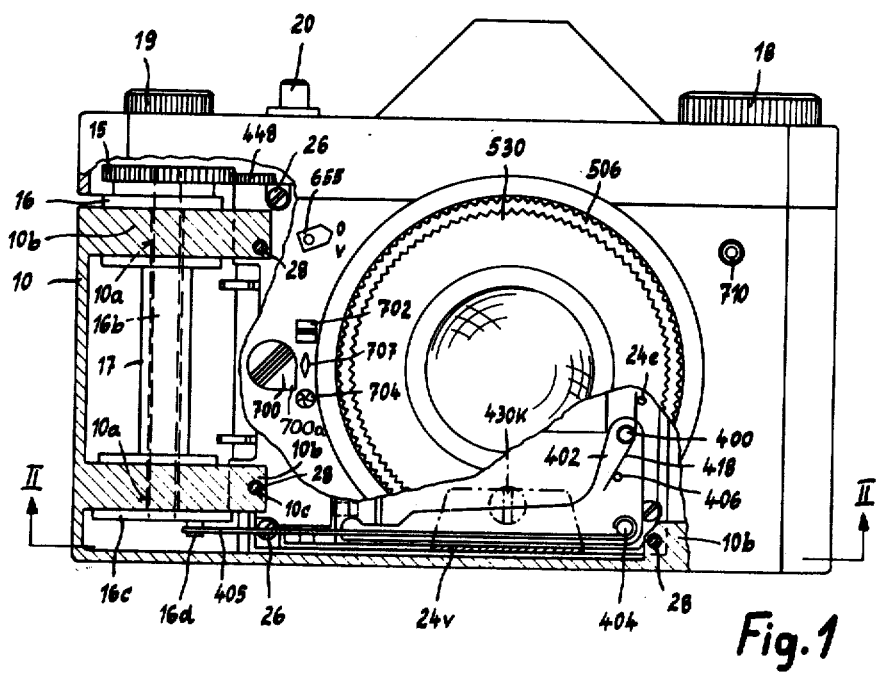
FIG. 1 is a schematic front elevation of a camera in accordance with a preferred embodiment of the invention, with parts broken away and parts in vertical section.

The present invention is applied preferably to a camera of the single lens mirror reflux type, although many features of the invention are applicable to cameras of other types. In the preferred form, the camera has a two-part housing or casing which, as seen in FIGS. 1 and 2, includes a front portion 10 and a rear portion 11 hinged to or otherwise removable from the front portion 10, to open the camera for loading and unloading film, in the conventional way. In FIG. 2, the film is shown at 12, and as the film is advanced, it passes from a conventional supply roll or cassette at the right hand end of the camera (when viewed as in FIGS. 1 and 2) past the exposure aperture or film aperture, to a take-up reel or spool at the left hand end of the camera. Various features of the camera not specifically disclosed in the present application may be of conventional construction.

A film feeding lever 16 and a rewind knob 18 serve to feed the film forwardly and to rewind it into the cassette upon completion of the desired exposures, in the conventional manner. The film feeding lever 16 is rigidly connected to a support spindle 16b, the axis of which is parallel to the plane of the film. The spindle is mounted in appropriate bearings 10a in the camera housing 10, and it provides a mounting for a hollow winding spool 17 of known kind. A gear 15 is mounted for free rotation on the upper end of the spindle 16b, and is operatively connected to the feed lever 16 by a conventional pawl and ratchet coupling (not shown) of known type, in such a way that when the film feed lever 16 is swung in a clockwise direction (viewed as in FIG. 2) the gear 15 turns with it, but when the clockwise pressure on the lever 16 is released, it may move back counterclockwise to its rest position, under the action of the spring, while the gear 15 remains in the position which it had previously assumed.

Fixed to the lower end of the spindle 16b is a cocking disk 16c provided with a coupling pin 16d attached to one end of a link 405 as further described below. The camera is also provided with a time setting knob 19 arranged on the top cover of the housing, which may be manually rotated to set the exposure time or shutter speed. Also accessible on the top cover is a trip button or trigger member 20 which, when depressed, initiates the action of the exposure cycle.

The fixed parts of the camera body or housing includes support surfaces 10b (FIG. 1) provided with threaded holes 10c to receive retaining screws for holding the focal plane shutter unit in place. The focal plane shutter of the camera is preferably constructed as a separate unit which may be readily assembled outside of the camera body and then may be easily inserted and mounted in the camera body as a pre-assembled unit. When the camera is of the pivoted mirror reflex type, as is preferably the case, the mirror itself and the principal mechanical parts controlling the mirror movement are also preferably included as part of the pre-assembled shutter unit.

The focal plane shutter unit, as shown particularly in FIGS. 3–7, has two approximately rectangular sections or halves, a rear section 22 and a front section 24, connected together by a number of screws 26. Openings 22a and 24a in the respective halves of the housing serve for the passage of fastening screws 28 threaded into the openings 10c in the camera housing, to hold the focal plane shutter assembly or unit tight against the support surfaces 10b of the camera housing 10.

Figure 5:
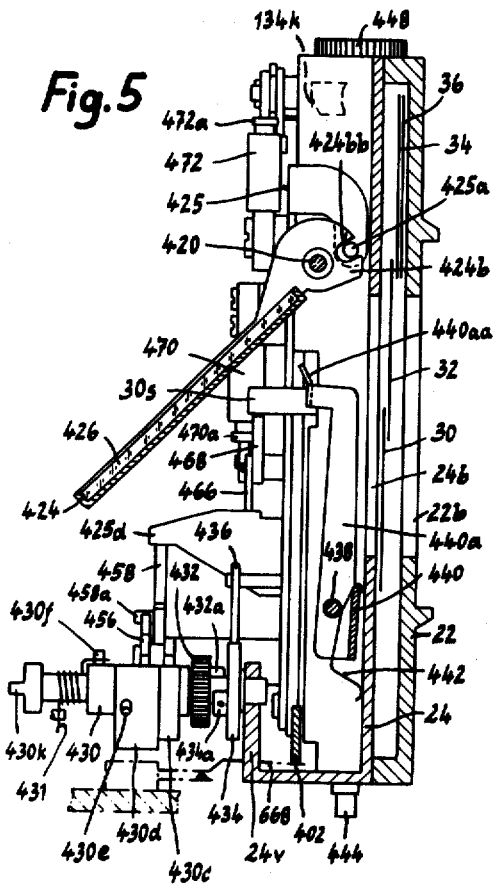
FIG. 5 is a vertical section taken approximately on the line V—V of FIG. 3.
Figure 6:
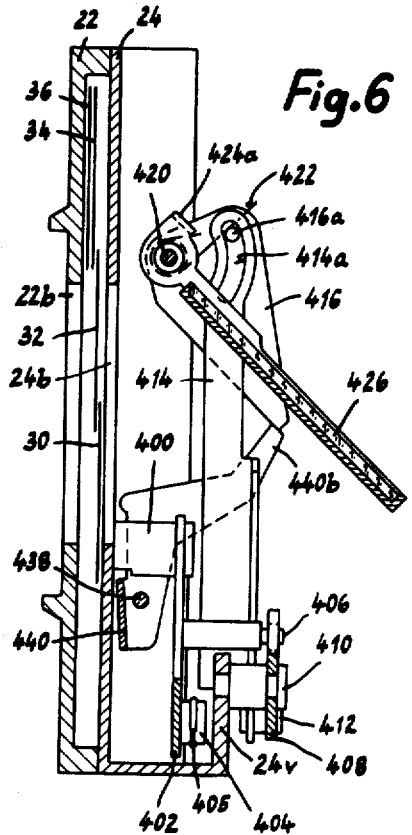
FIG. 6 is a vertical section taken approximately on the line VI—VI of FIG. 3.

Each half of the shutter housing has a picture window or exposure aperture 22b and 24b, respectively, the passage of light through these windows being controlled by flat slides or blades of the focal plane shutter, which are movable vertically parallel to the plane of the film, to alternately open and close the exposure aperture for passage of light. The film 12 (FIG. 2) passes horizontally just behind the rear face of the rear part 22 of the shutter housing, in an appropriate guide channel formed by flanges projecting rearwardly from the rear wall of the part 22, as shown in FIGS. 5 and 6.

The construction of the shutter slides or blades and the manner in which they are mounted for movement may be essentially the same as disclosed in Singer U.S. Pat. No. 3,513,763, granted May 26, 1970. For convenience, many parts of the present shutter are identified by the same reference numerals used in the Singer patent for the corresponding parts. Therefore, the description of these corresponding parts in the present application is considerably abbreviated, it being assumed that the reader is familiar with the construction as described in greater detail in the Singer patent.

The shutter comprises four flat approximately rectangular slides or blades 30, 32, 34, and 36 each made of sheet metal, preferably sheet steel, and each fastened at one side (the left side when viewed from the front as in FIG. 7) in a mounting piece or carrier 130, 132, 134, and 136, respectively, of plastic material or the like. Two guide rods 38 and 40, preferably of circular cross section, are mounted vertically in the housing portion 24, a little to the left of the picture window or exposure aperture. The slide mounting pieces are guided on and slide up and down these rods in the manner explained in the Singer patent. Just as in the patent, the slides 30 and 32 constitute an opening group of slides, and the slides 34 and 36 constitute the closing group. Each slide has its own individual driving spring 230, 232, 234, and 236, respectively, the upper end of which is secured to the slide or the respective mounting piece or carrier of the slide, and the lower end of which is anchored in the housing, to apply downward force to the respective carrier or mounting piece of the slide. The action of the slides in first opening and then closing the exposure aperture, for temporary passage of light to the film, is fully explained in the Singer patent.

Figure 3:
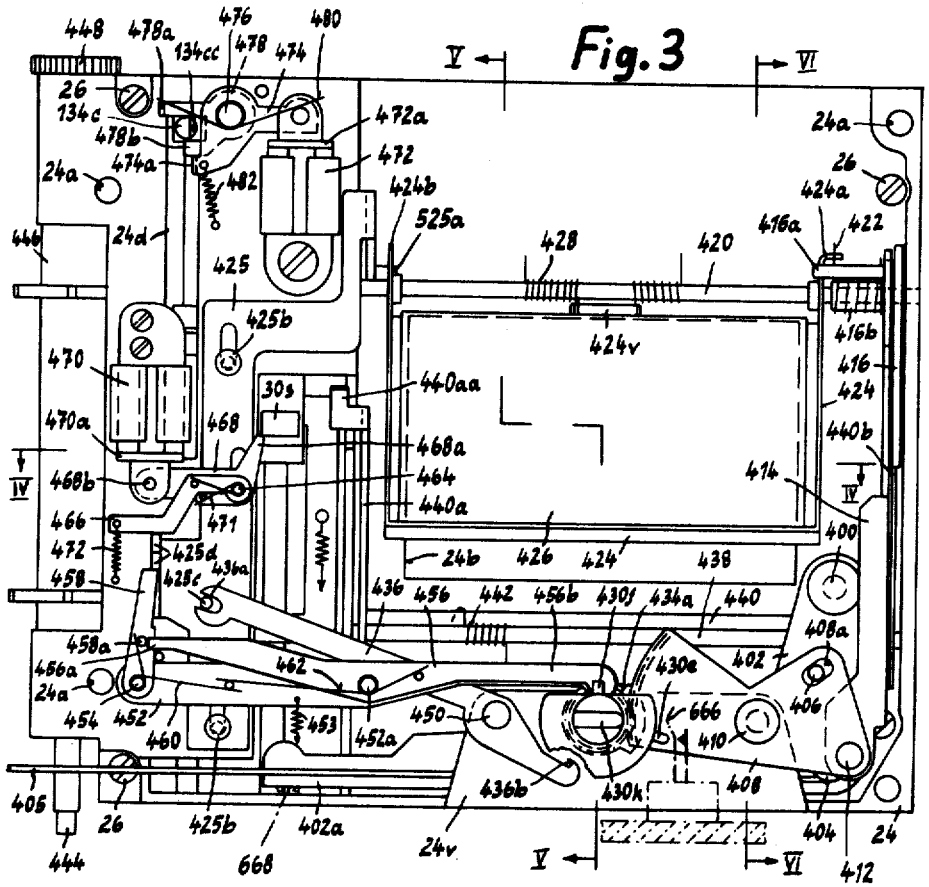
FIG. 3 is a front elevational view of a focal plane shutter unit constituting part of the camera, with parts broken away and parts omitted.
Figure 4:
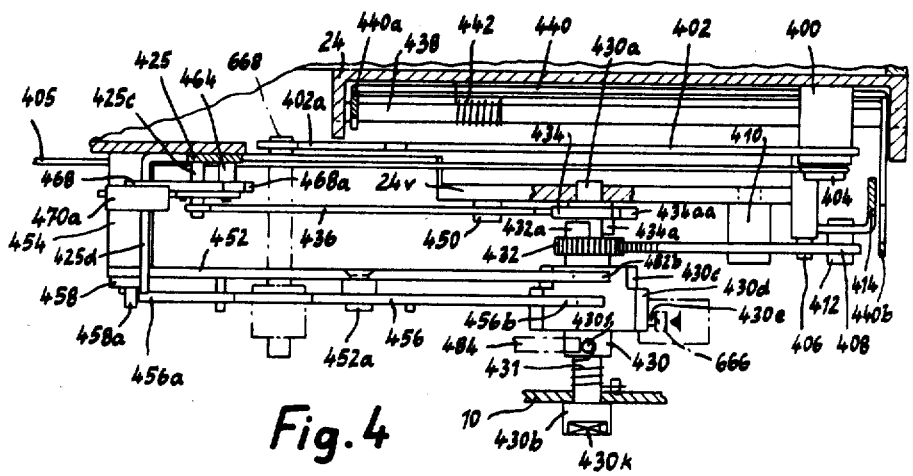
FIG. 4 is a horizontal section taken approximately on the line IV—IV of FIG. 3.

We find now especially to FIGS. 1, 3, and 4, there is a fixed pin 400 secured to and projecting forwardly from the shutter housing portion 24. A rocking lever 402 is pivotally mounted on this pin and has one arm 402a lying beneath and cooperating with a projection 30s on the carrier 130 of the opening slide 30. The rocking lever 402 also has a pin 404 fastened to one end of a link in the form of a steel spring 405 the other end of which is fastened to the previously mentioned pin 16d on the cocking disk 16c. Thus the rotation of the cocking disk 16c as a result of moving the film feeding lever 16 pulls leftwardly on the link or coupling member 405, thereby swinging the rocking lever 402 clockwise (viewed as in FIGS. 1 and 3) on its pivot 400. As further described below, this clockwise swinging of the lever 402 serves directly or indirectly to cock or tension all of the run down parts of both the focal plane shutter and the objective shutter, tensioning the respective springs ready for the next exposure cycles of both shutters, so that this lever 402 may be sometimes referred to as the main cocking or tensioning member.

The lever 402 also carries a pin 406 projecting forwardly therefrom and engaging in a slot 408a in an intermediate lever 408 which is rotatable on a pin 410 fixed in the housing. The location of the slot 408a is such, with relation to the locations of the respective pivots 400 and 410, that as the rocking lever 402 swings clockwise on its pivot, the pin and slot connection will cause the intermediate lever 408 to swing counterclockwise on its pivot 410. This counterclockwise swinging of the lever 408 will raise a pivot pin 412 carried by the right hand end of the lever 408, thereby raising the bellcrank lever 414 the lower end of which is pivoted on the pin 412. The upper or free end of the bellcrank lever has an arcuate slot 414a (FIG. 6) engaging a driving pin 416a on a cocking lever 416 which serves for cocking the operating spring of the reflex mirror, as further explained below. The parts 402, 408, and 414 are urged into the rest position illustrated in FIG. 3, by the restoring spring 418 (FIG. 1) which is wound about the pivot 400 and bears at one end against the operating pin 406 and at the other end against a fixed pin 24e on the shutter housing, tending to turn the rocking lever 402 in a counterclockwise direction to its rest position.

The lever 416 has a boss or hub 416b freely rotatable on a spindle 420 mounted transversely in the shutter housing part 24 to extend horizontally a little above the top of the exposure aperture or picture window 24b. A deflecting spring 422 is wrapped around the hub 416b, one end of the spring bearing against the driving pin 416a. The other end of the spring bears against a lever arm 424a at the right hand end of the mirror carrier 424, which carrier also has a second arm 424b at its left hand end, as seen in FIG. 3. Both of these arms are freely pivoted on the spindle 420.

As best seen in FIG. 5, the second arm 424b has a slot 424bb engaging a pin 425a of a slide 425 which is mounted at 425b (FIG. 3) on the shutter housing part 24, to be movable parallel to the movements of the shutter slides or blades; that is, to be movable vertically if the camera is oriented in the customary position for taking pictures, but of course the camera could be oriented in any direction. Merely for convenience of description, movements of various parts are described as vertical or horizontal, as the case may be, with reference to FIGS. 3, 5, and 6, on the assumption that the camera is oriented in the position in which it is customarily but not necessarily used.

A reflex mirror 426 is suitably fastened, as for example by cement, to the carrier 424. A return spring 428 (FIG. 3) spirally wound around the spindle 420 bears at both ends against the shutter housing 24, and in the middle presses against a projection 424v of the mirror carrier 424, in a direction to urge the carrier and the mirror to swing downwardly to the observation or viewing position shown in FIGS. 3, 5, and 6.

Another transversely extending spindle 438 secured to the housing part 24 extends horizontally a little below the bottom of the picture window or exposure aperture 24b and has a U-shaped rocker 440 pivotally mounted thereon. The left hand limb or arm 440a of this rocker has a portion 440aa which is held by a wedge-form projection 134k (FIG. 7) of the closing slide 34, 134 when the focal plane shutter is in the rest or rundown position. The right hand limb or arm 440b of the rocker acts as a latch for the mirror cocking lever 416, as seen in FIG. 6, holding this lever in its upper position illustrated, thereby keeping the deflecting spring 422 in its tensioned or cocked condition as necessary for swinging the mirror up from the viewing position illustrated in FIGS. 5 and 6 to the picture taking or exposure position (not illustrated). Wound around the spindle 438 is a setting spring 442 (FIGS. 3 and 5) which engages the rocker 440 and tends to swing the rocker arms clockwise when viewed as in FIG. 5 or counterclockwise when viewed as in FIG. 6, to keep the arm 440b in latching engagement with the lever 416.

Rotatably mounted on the part 24 of the shutter housing is a vertical bearing spindle 444 (FIGS. 3, 5, and 7) with a film feed roller 446. The upper end of this spindle is provided with a pinion 448 which meshes with the gear wheel 15 when the focal plane shutter unit is installed in the camera, as seen in FIG. 1.

The portion 24 of the shutter housing has a projection 24v (FIGS. 1–6) which forms a support not only for the pivot pin 410 previously mentioned, but also for the rear end of the cocking or tensioning spindle 430, the forward end of which has a bearing in a wall of the camera housing 10, as seen schematically in FIG. 4. A spring 431 wound around the spindle has one end engaged with a fixed pin on the camera housing and the other end engaged with a pin 430f on the spindle to tend to turn this spindle in a counterclockwise direction when viewed from the front as in FIG. 3. A toothed pinion 432 is mounted for loose rotation on the cocking spindle 430, the teeth of this pinion meshing with segmental gear teeth on the left hand end of the intermediate lever 408 as seen in FIGS. 3 and 4. This pinion has an axial projection 432a (FIGS. 4 and 5) on its rear face which, in a certain angular position, engages a forwardly extending axial projection or lug 434a on a control disk 434 which is fixed to the cocking spindle 430. When the film feeding lever 16 is swung, to pull on the link 405 and thereby swing the main cocking lever 402 clockwise, the consequent counterclockwise swinging of the intermediate lever 408 causes a clockwise rotation of the pinion 432, so that the lug 432a thereon engages the lug 434a on the control disk 434 and thereby turns the cocking spindle 430 clockwise against the force of its spring 431.

Near the middle of the cocking spindle 430 there are two operating cam elements 430c and 430d arranged one behind the other, and also a radially extending pin 430e. An operating lever 436 is pivoted at 450 on the housing projection 24v and has a slot 436a at its left end, receiving a pin 425c on the slide 425. At its right end, the lever 436 has a latching hook 436b which cooperates, in a predetermined operative position, with a nose 434aa on the control disk 434.

Another control lever 452 is mounted at its left end on a fixed pivot 454 on the shutter housing part 24, and is biased in a clockwise direction by a spring 453 (FIG. 3). At an intermediate point of its length, this lever 452 carries a bearing pin 452a on which another control lever 456 is pivotally mounted near its middle. A latching lever 458 is pivotally mounted on the same bearing pin 454 on which the lever 452 is mounted, and extends in a generally upward direction therefrom, as best seen in FIG. 3. A spring 460 tends to swing the latching lever 458 in a clockwise direction on its pivot 454, to tend to hold a pin 458a thereon against the left end 456a of the previously mentioned control lever 456. Another spring 462 tends to swing the control lever 456 in a clockwise direction on its pivot 452a. The right hand end 452b of the lever 452 coacts with the operating cam element 430c on the cocking spindle 430, and the right hand end 456b of the lever 456 coacts with the control cam element 430d on the cocking spindle 430.

Two latching levers 466 and 468 are both mounted on the fixed pivot pin 464 on the housing portion 24, and are resiliently coupled to each other by means of a connecting spring 471 which tends to turn the lever 466 counterclockwise relative to the lever 468 (or vice versa to turn the lever 468 clockwise relative to the lever 466) to a limit position relative to each other, which is the position shown in FIG. 3. Still another spring 472 biases the latching lever 466 in a counterclockwise direction. This lever 466 cooperates with the arm 425d of the slide 425. The arm 468a of the latching lever 468 cooperates with the nose or lug 30s of the opening slide 30, 130 of the focal plane shutter, to hold this opening slide in its initial closed position until such time as the latch is released. The other arm 468b of this latching lever 468 is pivoted to the armature 470a of an electromagnet 470 fixed to the shutter housing 24. As will be explained below, the de-energization of this electromagnet 470, assuming that various mechanical parts have previously been moved to proper position, will permit the latching lever 468 to swing counterclockwise on its pivot 464, releasing the latching of the member 30s and permitting the first opening slide or blade 30 of the focal plane shutter to begin its downward movement to open the shutter.

Another electromagnet 472 is also secured to the shutter housing portion 24. The armature 472a of this electromagnet is pivoted to the right hand end of a rocking lever 474 which is pivotally mounted on a fixed pivot 476 on the housing portion 24. A forked latching lever 478 is also mounted on this same pin 476, and has an upper arm 478a just above the pin 134c of the closing slide or blade assembly 34, 134 when these parts are in their upper tensioned position, and a second arm 478b just below this same pin 134c, as well seen in FIG. 3. A spring 480 wound around the pivot 476 acts downwardly on the arm 478a of the latching lever 478, to hold the arm 478b against a lug 474a on the lever 474, this contact determining the normal position of the two levers 474 and 478 relative to each other. A further spring 482 biases the coupled levers 474 and 478 in a counterclockwise direction on their pivot 476.

It has been mentioned above that when the film feeding lever 16 is operated to feed the film, this swings the main cocking lever 402 clockwise, swings the intermediate lever 408 counterclockwise, and turns the pinion 432 clockwise to turn the cocking spindle 430 clockwise against the force of its spring 431. When the cocking spindle 430 reaches its fully cocked or tensioned position, it is held in this position by the right hand end of a latching lever 484 which is only indicated schematically in FIG. 4, this right hand end dropping behind the radial pin 430f of the cocking spindle, thereby preventing the cocking spindle from running down in a counterclockwise direction until the latch is released. When the cocking spindle is latched in the tensioned position, the main cocking lever 402, the intermediate lever 410, and the pinion 432 can all be restored to their initial positions under the influence of the spring 418, the lug 432a on the pinion 432 simply separating in a counterclockwise direction from the lug 434a on the cocking spindle while the latter remains held by the latch 484. This latch 484 is pivoted intermediate its ends on a fixed pivot, and the left hand end (not shown) of this latch underlies the lower end of the trip or trigger plunger 20 (FIG. 1) so that when the trip 20 is depressed, it swings the latching lever 484 to raise the right hand end thereof out of the path of the pin 430f, permitting the cocking spindle 430 to start its counterclockwise or running down movement under the influence of its spring 431, thereby initiating the exposure cycle. The various movements initiated or controlled by the running down movement of the cocking spindle will in part be understood from the preceding description of the construction and in part be further explained below.

In addition to the focal plane shutter installed in the camera housing as above explained, the camera of the present invention is so designed that an objective shutter (sometimes called a central shutter, or a lens shutter) may also be mounted on the camera and used for controlling the exposure, the objective shutter preferably being part of an exchangeable or interchangeable objective optical unit containing the camera lens elements (collectively referred to as the lens) as well as the objective shutter itself. To this end, the front of the camera body is provided with a conventional bayonet joint mounting 10h (FIGS. 2, 12, and 13) into which can be detachably inserted a holder 500 (see also FIG. 10) having conventional bayonet lugs 500h for engaging and mating with the flanges of the bayonet mounting 10h on the camera body. As well understood in the photographic art, connection of the parts is achieved by bringing the holder 500 axially toward the camera body in proper alignment with the optical axis, and then twisting or rotating the holder so that the bayonet lugs 500h on the holder engage under the corresponding lugs on the camera body. The parts may be disengaged by a reverse movement, first twisting the holder in the opposite direction until the lugs are disengaged, and then pulling the holder axially away from the camera body. Mounted on and carried by the holder are the camera lens, which may be conventional, and the objective shutter, which is described below. Various different holders may be equipped with similar shutters but with different lenses, one having for example a normal lens, another a wide angle lens, and another a telephoto lens, so that different photographic effects may be produced, depending upon which optical unit or objective unit is chosen for attachment to the camera. Indeed, the photographer may also attach to the camera what may be called a normal or simple objective unit or lens unit; that is, one having merely a lens therein, without any objective shutter. It is one of the features of the present invention that the camera may be used with a simple objective unit having no shutter therein, as well as with an objective unit which does have an objective shutter in addition to the lens, and that the camera is equipped with fool-proof interlocking means preventing faulty operation in case the photographer tries to set the camera for taking a picture with an objective shutter, mistakenly believing that the objective unit mounted on the camera has such a shutter when in fact it is a simple objective unit having only a lens and no shutter.

In the holder 500 (assuming that this is a holder for a unit having an objective shutter, and not merely a holder for a simple lens unit with no shutter) there is a cocking or tensioning spindle 502 (FIGS. 10 and 11) with its axis parallel to the optical axis, which spindle projects out of the rear wall of the holder 500 and has an enlarged head provided with a diametrical coupling slot 502a. When the holder is mounted on the camera, this coupling slot 502a engages with a diametrical coupling flange 430k (FIGS. 1, 2, and 5) on the front face of an enlarged head at the front end of the cocking spindle 430 in the camera body, thus making a driving connection between the members 430 and 502. Whenever the objective unit is to be mounted on or removed from the camera body, the spindles 403 and 502 must be turned to such position that the diametrical flange and slot are arranged tangentially relative to the optical axis, rather than radially with respect thereto.

The holder 500 contains the objective shutter housing, partially shown at 504, the housing including an objective tube 504a in which the lens elements or components (not shown) are mounted in the usual conventional manner. Usually one or more of the lens elements are in front of the shutter blades, and one or more lens elements are behind the shutter blades. The objective shutter housing 504 is axially displaceable relative to the holder 500, for focusing purposes, by means of screw threads of known form, operated by turning the focusing ring or distance setting member 506 (FIGS. 1 and 2), any conventional known form of focusing arrangement being used, the details of which are not important for purposes of the present invention. But because of the axial movement for focusing, the cocking spindle 502 in the interchangeable unit consists of two parts coupled together for rotary movement while permitting a telescoping axial displacement, arrangements of this kind being well known in the art and therefore not here illustrated.

Firmly fastened to the front end of the spindle 502 is a pinion 506 having teeth in meshing engagement with the internal teeth 508a of a cocking or tensioning ring 508 rotatable about the optical axis of the shutter as a center. In this part of the description the word "shutter" refers, unless otherwise indicated, to the objective shutter now under discussion, rather than to the focal plane shutter previously described. In addition to the teeth which mesh with the ring 508, the pinion 506 also has a forwardly extending axial projection 506a which, in a particular angular position, drives a rearward axial projection 510a on the rear end of the cocking or tensioning spindle 510 of the objective shutter. Fixed to this spindle 510 is the driving disk 512, sometimes referred to as the master member, the running down movement of which serves to open and close the blades of the objective shutter. A main driving spring or master spring 514 engaging the disk 512 is tensioned or loaded when the tensioning or cocking spindle 510 is turned clockwise when viewed from the front as in FIGS. 8 and 9, and this spring serves to drive the master member 512 in a counterclockwise direction (when it is unlatched from its tensioned or cocked position) to cause opening and closing of the shutter blades.

In the shutter housing 504 are a series of shutter blades 516 as well as a series of diaphragm leaves 509, only one of each of these elements being illustrated in FIG. 8, as those skilled in the art will readily understand that several of each are employed.

Each shutter blade 516 has an aperture 516a by means of which it is pivotally mounted on a pivot pin 518a of a blade mounting ring 518, and it also has a slot 516b which embraces a driving pin 520a of a blade driving ring 520. Each of the diaphragm leaves 519 has a pin 519a rotatably mounted in some fixed part of the housing 504, and has another pin 519b which engages in a control groove 522a of the diaphragm control ring 522. These rings 518, 520, and 522, like the ring 508, all rotate about the optical axis as a center. The ring 508 has a pin 508b which projects forwardly through an arcuate slot in the rear wall of the shutter housing, into the interior of the housing.

When the film feeding lever 16 is swung to feed the film, the consequent turning of the cocking shaft 430 in a clockwise direction when viewed from the front, as previously described, will be transmitted through the coupling 430k and 502a to the cocking shaft 502 in the interchangeable unit, and will be transmitted thence through the lugs 506a and 510a to the cocking shaft 510 of the objective shutter, turning the master member or disk 512 in a clockwise direction and loading the master spring 514. The master member 512 is then held in the cocked or tensioned condition by a spring loaded latching lever 524 (FIGS. 8 and 9) which drops behind a projection 512a on the disk 512, and the master member is thus retained in its tensioned position until the latch 524 is released. The member 512 is pivotally connected to one end of a driving pawl 526, the other end of which contains the usual conventional notch for engaging a pin 520b on the shutter blade driving ring 520. As well understood in the art, during the running down movement of the master member 512 the pawl or link 526 will first push the pin 520b to turn its ring 520 counterclockwise, during approximately the first half of the running down movement of the master member 512, to open the shutter blades 516, and then during approximately the second half of the running down movement of the master member, the link 526 will pull on the pin 520b to turn the blade driving ring 520 back in a clockwise direction to close the shutter blades. The total turning of the master member 512 during its running down movement may vary, depending upon variable factors of the exact design chosen, but commonly it is about half a revolution or 180° so that the opening movement of the shutter blades occurs through about the first 90° of the turning of the master member, and the closing movement occurs through about the final 90° thereof.

The diaphragm control ring 522 is biased in a counterclockwise direction by a spring 528 (FIG. 8) attached at one end to an arm 522b on the ring 522 and striving to pull this ring counterclockwise against an abutment 530a on the diaphragm preselector ring 530 (FIGS. 1, 2, and 8) mounted for rotation on the periphery of the holder 500 near the front end thereof.

There is also a spring 532 (FIG. 8) having one end anchored on the previously mentioned forwardly projecting pin 508b on the operating ring 508, and having its other end connected to and pulling in a clockwise direction on a pin 518b on the blade mounting ring 518, thereby tending to move this mounting ring in a clockwise direction. The pin 518b has a portion in the plane of the arm 522b on the diaphragm control ring, lying against this arm on the counterclockwise side thereof, so that clockwise movement of the blade mounting ring 518, after the pin 518b comes in contact with the arm 522b, will cause corresponding clockwise movement of the diaphragm control ring 522. The spring 532 is more powerful than the spring 528 which tends to turn the diaphragm control ring counterclockwise, so that whenever the blade mounting ring 518 is permitted to turn in a clockwise direction, it will carry the ring 522 clockwise along with it.

There is still another spring 534 shown in broken lines in FIG. 8, the left end of which is anchored to a fixed pin in the housing 504, while the right end of this spring is connected to the pin 508b of the operating ring 508, in a location to the rear of the shutter housing itself. This spring 534 biases the ring 508 in a counterclockwise direction, and thus also, through the various connections from the ring 508 back to the cocking spindle 430 in the camera body, it also biases the spindle 430 in a corresponding counterclockwise direction. Since the pin 518b on the ring 518 coacts at the same time with the arm 522b on the ring 522, both of these rings are biased by the spring 532 in a clockwise direction sufficiently for a rearwardly projecting arm 518c on the ring 518 to strike against an abutment lever 536 which is pivotally mounted on the operating ring 508, externally to the rear of the shutter housing 504. During counterclockwise movement of the operating ring 508, the lever 536 thereon reaches a position where the tail of this lever 536 strikes against a fixed pin 538 in the housing 504, which causes the abutment lever 536 to swing clockwise on its own pivot, thereby releasing it from the arm 518c so that the spring 532 may turn the ring 518 clockwise again without hinderance from the abutment lever 536 on the operating ring 508.

The objective shutter illustrated in FIGS. 8 and 9 is of a type having an electronic control arrangement for determining the exposure time, often called the shutter speed. For this purpose an electromagnet 540 is built into the shutter housing 504, and has a pole shoe 540a against which the metallic armature 542 can be pressed. This armature is mounted in insulated condition on an arm 544a of a latching lever 544 rotatable on a pin 546 carried by the housing 504. A resilient arm 544b on the latching lever 544 cooperates with the projection or shoulder 512c of the driving disk 512. A third arm 544c on the latching lever projects into the path of a cam element 512b on the disk 512.

A second electromagnet 548 (FIG. 9) is also secured in the housing 504 and is equipped with an armature 550 pivotally mounted on a rocking lever 552. The lever is mounted to swing on a pivot 554 in the housing, and is resiliently or non-positively coupled with a further rocking lever 558, rotatable on the same pivot 554. The coupling between the two levers 552 and 558 is provided by a spring 556 which reacts against a pin 552a on the lever 552 and a pin 558b on the lever 558, tending to swing the latter lever clockwise on the pivot 554 until an edge of the lever 558 comes into contact with the pin 552a. The arm 558a of the lever 558 cooperates with the tail of the latching lever 524 as illustrated in FIG. 9. A spring 559 biases the lever 558, and with it the lever 552, in a clockwise direction on their common pivot 554. An intermediate lever 560 is mounted on a fixed pivot 562 and has one arm 5601a which coacts as illustrated with the pin 558b on the lever 558, and has another arm 560b which is forked to engage the pin 508b on the operating ring 508.

When the interchangeable objective unit is mounted on the camera, the electrically operated elements of the interchangeable unit are operatively connected to the associated electrical elements of the camera through sliding contacts which are engaged or disengaged, as the case may be, during the twisting bayonet movement performed when mounting or detaching the interchangeable element. Such sliding contacts are known per se, and are schematically indicated in FIG. 2 and in the wiring diagram, FIGS. 14a and 14b, the fixed contacts on the camera body being designated K1 and the contacts on the interchangeable unit being designated K2.

Figure 14A:
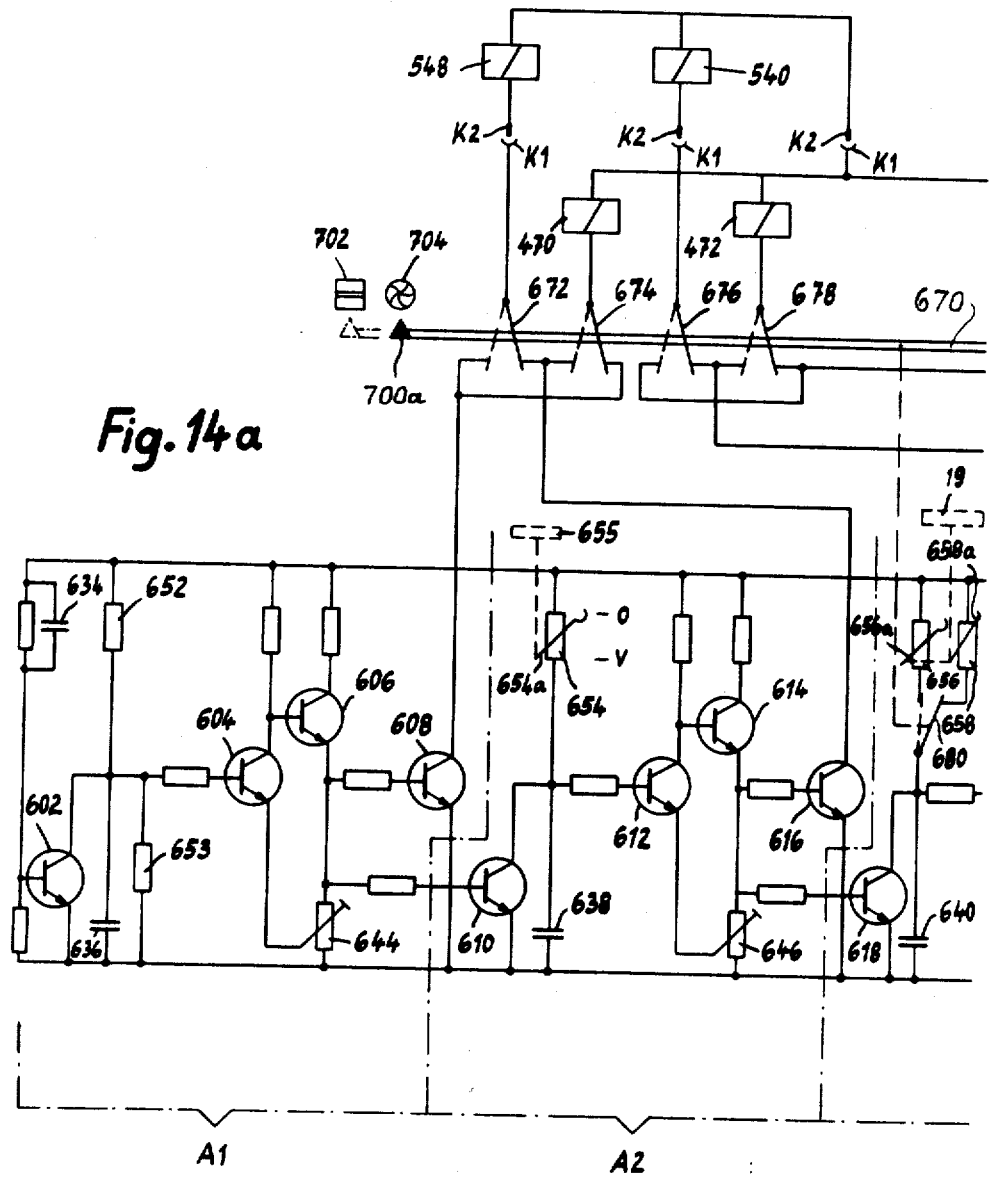
FIGS. 14a and 14b together constitute a wiring diagram of the electronic circuitry and associated parts.
Figure 14B:
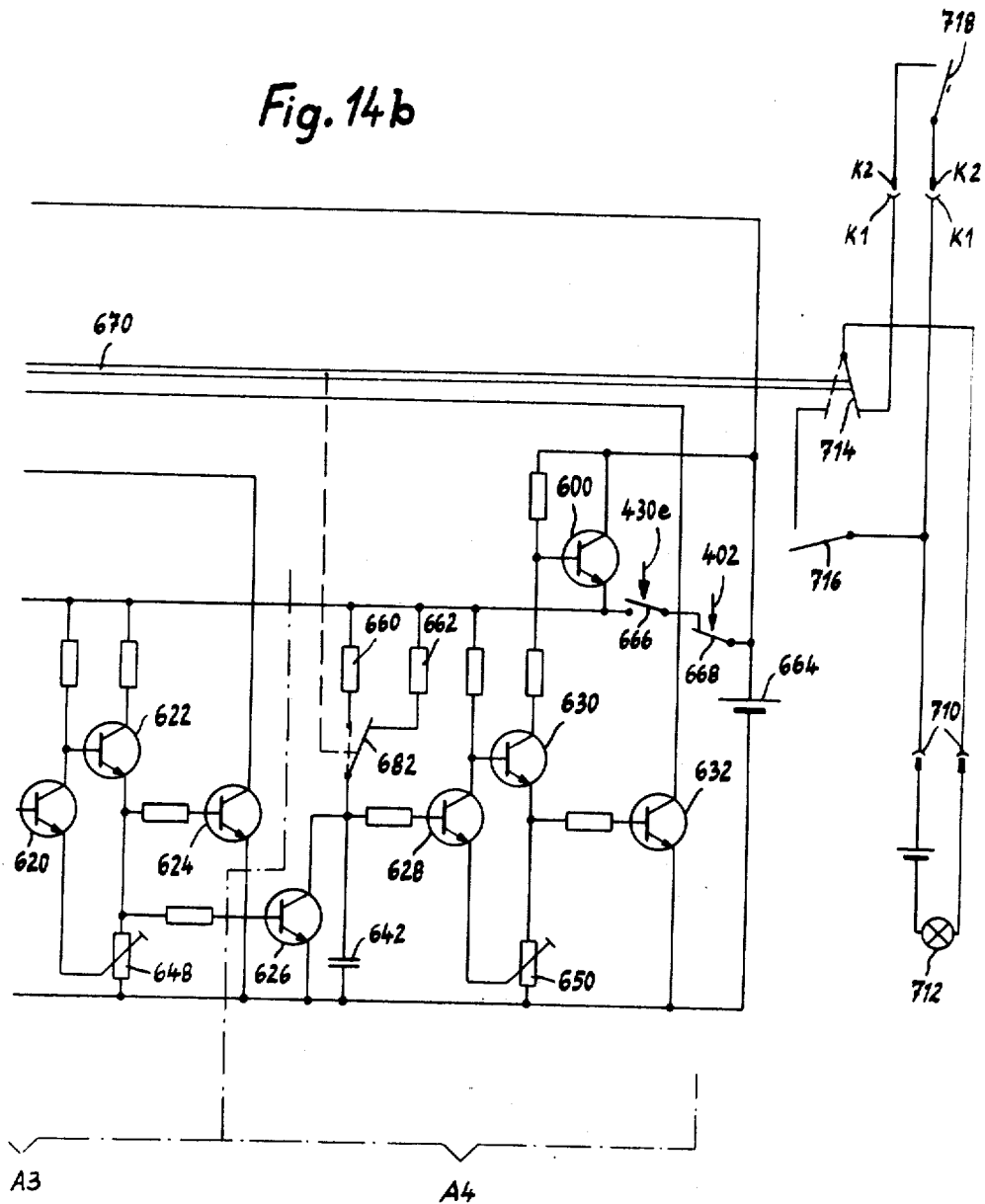

FIGS. 14a and 14b respectively constitute the left portion and right portion of a wiring diagram schematically showing the electrical connections and electronic circuitry for controlling the operation of the camera, including both the focal plane shutter built into the camera and the objective shutter detachably or interchangeably mounted on the camera.

The circuitry includes four Schmitt triggers which are arranged in series and include transistors 602 to 632. Each trigger is adjustable to the required time or delay interval through a time-determining RC member constituted by respective capacitors 636 to 642 and associated resistors 652 to 662. Thus there are four control stages or switching stages in the circuitry, each stage having one Schmitt trigger therein, the stages being respectively designated by the reference numerals A1, A2, A3, and A4 arranged along the bottom of the wiring diagram, and the approximate dividing lines between what may be conveniently considered one stage and the next stage being indicated by dot dash lines.

The resistors 652, 660, and 662 are fixed resistors of different resistance values, while the resistors 654, 656, and 658 are adjustable or variable. The moving adjusting element 654a of resistor 654 is connected to a manually shiftable setting member 655 on the camera body (see also FIG. 1) and may be shifted between positions designated "V" and "O". The movable adjusting elements of resistors 656 and 658 are indicated schematically at 656a and 658a, respectively, and are coupled together for operation by the time setting knob 19 (see also FIG. 1) on the camera body, which can be turned manually with relation to an exposure time or shutter speed scale. The setting potentiometers 644, 646, 648, and 650, one in each switching stage, are used to justify or adjust the four switching stages for proper operation.

In addition to the already mentioned capacitors 636, 638, 640, and 642, one in each switching stage, there is also a further capacitor 634. It will also be noted from the wiring diagram that there are a number of fixed resistors shown which, for the sake of simplicity, are not designated by individual reference numerals. The function of such resistors in these indicated positions in the circuit will be readily understood by those familiar with electronic circuits of this general character.

The electrical connections are fed from a suitable source such as a battery 664, which can be coupled into the circuit through a wiper contact switch 666, closed by the pin 430e (see FIG. 3) of the cocking spindle 430, just as the cocking spindle beings its running down movement from its tensioned or cocked position. In series with the switch 666 there is also a safety contact switch 668 operated by the main cocking lever 402. In addition, the circuitry includes a switching transistor 600, functioning in a manner described below.

Figure 12:
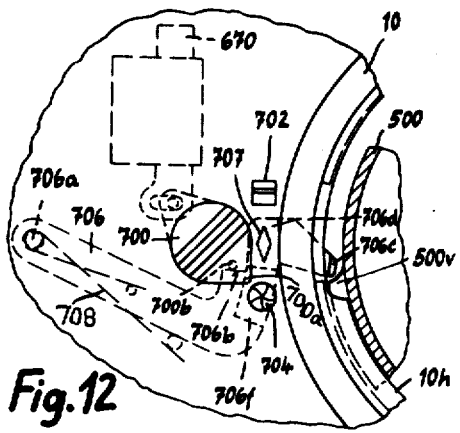
FIG. 12 is an elevational view of a fragment of the front wall of the camera, showing the shutter selector and the change-over arrangement in one position, for taking pictures with the objective shutter.
Figure 13:
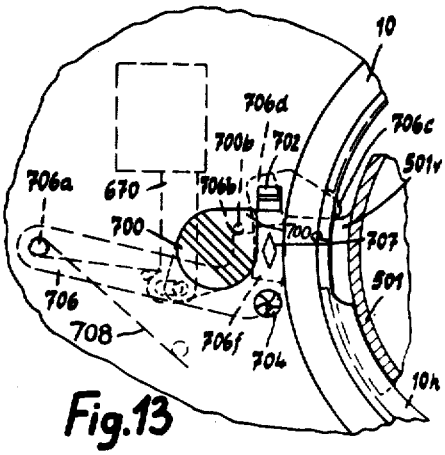
FIG. 13 is a view similar to FIG. 12 with the parts in another position, for taking pictures with the focal plane shutter.
Figure 7:
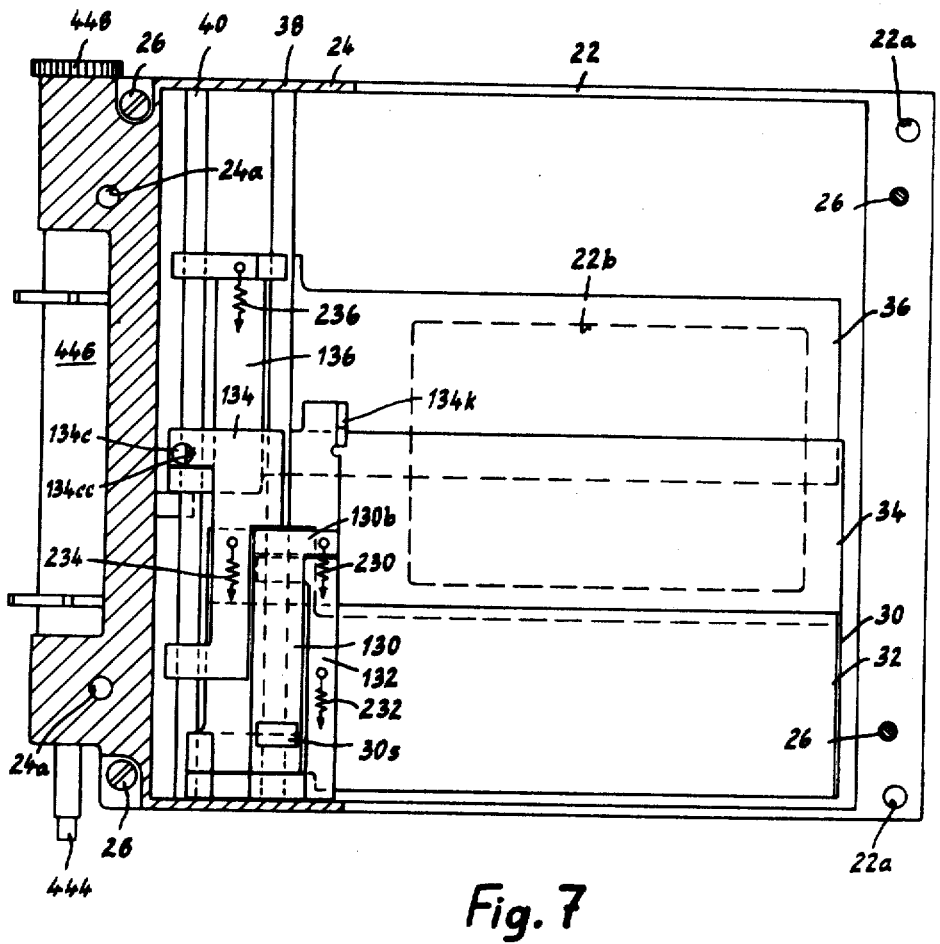
FIG. 7 is a front elevational view of the focal plane shutter unit shown in FIG. 3, but with parts in vertical section and many parts shown in FIG. 3 omitted in order to show more clearly the shutter slides and their relation to each other.

There is also a movable change-over switch 670, indicated schematically in the wiring diagram (FIGS. 14a and 14b) and also seen in FIGS. 12 and 13. This is adjustable to either one of two positions and is operated by a setting knob 700 (FIGS. 1, 12, and 13) mounted on the camera body for manual actuation. The setting knob 700 has a nose or pointer 700a which acts as an indicator in relation to two symbols 702 and 704. The former is a rectangular symbol having two central stripes and is a symbol for the focal plane shutter. The circular iris symbol 704 represents the interchangeable objective shutter. These symbols are also shown in the left hand part of the wiring diagram, FIG. 14a, which schematically includes also the pointer or nose 700a for movement to one or the other of these symbols.

The setting knob 700 is connected to the switch 670 by a pin and slot connection schematically shown in FIGS. 12 and 13. When the knob is turned to point the nose 700a toward the objective shutter symbol 704, the change-over switch is in the position shown in full lines in the wiring diagram, FIGS. 14a and 14b. The previously described electromagnets 470, 472, 540, and 548 are connected into the electronic circuitry in the manner illustrated in the wiring diagram, with the switches 672, 674, 676, and 678 in their respective full line positions, and with the switches 680 (FIG. 14a) and 682 and 714 (FIG. 14b) also in their respective full line positions. When the setting knob 700 is turned so that its nose points toward the focal plane shutter symbol 702, then the change-over switch changes all of the switch contacts just mentioned (672 to 682, and 714) from the respective full line positions to the respective broken line positions illustrated in the wiring diagram.

To insure that the change-over switch will not be in a position for taking a photograph with the objective shutter when the objective unit attached to the camera is a simple objective or lens unit with no shutter therein, the camera is provided, in the vicinity of the change-over setting parts, with a safety lever 706 (FIGS. 12 and 13) pivotally mounted in the camera housing on a pin 706a. A shoulder 706b on this lever cooperates with a pin 700b on the setting knob 700. An extension or nose 706c on the safety lever projects into the bayonet mounting 10h of the camera and cooperates with a projection 500v on the holder 500 which carries the lens and the objective shutter. It will be noted from FIG. 12 that this projection 500v is of such size that it does not interfere with the nose 706c of the safety lever 706, and the lever is free to move throughout its entire range without any hindrance from the projection 500v. Thus the safety lever does not prevent the setting knob 700 from being turned to the objective shutter exposure position if desired.

On the other hand, if an objective unit of simple or normal form, having no shutter therein, is applied to the camera, a different condition prevails. The rear part or camera contacting part of a holder for a simple lens without shutter is indicated in FIG. 13 at 501. It coacts with the bayonet connection parts 10h on the camera in the same way as the holder 500 of the objective shutter unit, and is similar thereto except that the lug or flange 501v of the holder 501 is longer in a circumferential direction than the corresponding lug 500v of the holder 500, and is so positioned, as easily seen in FIG. 13, that it prevents the nose 706c of the safety lever 706 from being moved downward from focal plane shutter position to objective shutter position. Likewise, if the safety lever 706 is already in the objective shutter position when the simple holder 501 is applied to the camera, the twisting motion of the holder 501, in a clockwise direction when engaging the bayonet lugs, will automatically move the safety lever 706 upward to the focal plane shutter position. The shoulder 706b thereon, engaging the pin 700b on the setting knob 700, will turn this setting knob to the focal plane shutter position if it was previously in the other position, during the mounting of the simple holder on the camera, and thereafter will prevent the setting knob 700 from being shifted to the objective shutter position so long as the simple objective holder remains on the camera. A spring 708 tends to swing the safety lever 706 downwardly and keeps it in this position (regardless of the position of the setting knob 700) except when the holder 501 of a simple objective is applied to the camera. In this lower position of the safety lever, an appropriately colored area 706d of the lever is visible through a small window 707 in the camera body, this spot of color indicating to the user that he has a choice of either shutter. When a simple objective holder 501 is applied to the camera, swinging the safety lever 706 upwardly against the action of its spring 708, a different colored area 706f of the safety lever lies behind and is visible through the window 707, this different color being a signal to the operator that he does not have a choice of shutters, but must use the focal plane shutter. Indeed, as above explained, he cannot use the setting for an objective shutter even if he tries to do so, because the shoulder 706b prevents the setting knob 700 from being turned to the objective position.

To enable the taking of flash light photographs, the camera body is provided with a two-pole plug 710 (FIG. 1, also shown schematically in FIG. 14b) to which a conventional cable connecting to a conventional flashlamp 712 (FIG. 14b) can be connected. In the camera is a switch 714 operated by the change-over switch mechanism 670 as illustrated schematically in the wiring diagram. The flash circuit includes, in addition to the parts just mentioned, a further switch 716 installed in the camera in position to be closed in conventional manner by a run-down member of the focal plane shutter mechanism when the shutter is in its fully open position, and another switch 718 installed in the objective shutter 504 in position to be closed in conventional manner by a run-down member of the objective shutter when the latter is in its fully open position. When the change-over switch mechanism 670 is in position for an objective shutter exposure, the switch 714 is in such position that it is the switch 718 of the objective shutter which is effective to close the flash circuit. When the change-over switch is in the focal plane shutter position, then it will be seen from the wiring diagram that it is the focal plane shutter switch 716 which is effective to close the flash circuit.

The operation of the camera, including its electronic control mechanism, will now be described. Let it be assumed that an objective unit having an objective shutter is applied to the camera, and that both shutters are in their respective tensioned or cocked positions. The various parts will then be in the respective positions illustrated in FIGS. 1–6 and 8 and 9, but not in the position illustrated in FIG. 7, since the latter shows the focal plane shutter in its rest or run-down position.

Let it be further assumed that the user desires to take a photograph by means of the objective shutter rather than the focal plane shutter, and that he has brought the setting knob 700 to the position shown in FIG. 12, with the indicating nose pointing toward the objective shutter symbol 704. The change-over switch mechanism 670 is therefore in the position with the various movable switches controlled thereby in their respective full line positions illustrated in the wiring diagram.

The setting member 655 of the resistor 654 is brought to the desired position, depending upon whether the operator desires a long initial delay of about 10 or 15 seconds to enable him to get himself into the picture, in which case the resistor adjusting element is set to the "V" position, or whether he does not desire an initial delay, in which case the adjusting element is set to the "O" position providing for a very short initial delay of just a few milliseconds. Also, the exposure time or shutter speed is set on the adjusting member 19, which simultaneously adjusts the movable elements or cursors of the variable resistors 656 and 658, although only the latter is effective at this time because of the position of the switch 680, as will be plainly seen from the wiring diagram. The safety switch 668 will be kept closed at this time by the position of the rocking lever 402, which keeps the switch closed whenever the lever is in its rest position, and opens the switch when the lever 402 is moved away from its rest position during a cocking or tensioning operation. The flash selector switch 714 will be in the position for controlling the flash from the objective shutter, if flash is to be used. The flash, if used, is of the "X" or instantaneous type, without flash delay. The diaphragm preselector ring 530 is set by the photographer to the desired value of the diaphragm aperture, and the distance or focusing setting is made by turning the focusing ring 506. The image of the picture is observed, the light entering through the fully open objective shutter and being reflected by the mirror 426 into the viewfinder or onto a conventional ground glass focusing screen, the exact type of viewing arrangement being variable and immaterial so far as the present invention is concerned.

After these preliminary setting procedures, the camera is ready to be triggered or tripped to start the exposure cycle. This is done by depressing the trip or trigger member 20 (FIG. 1) which moves the latching lever 484 (FIG. 4) out of the way of the pin 430f, so that the cocking spindle 430 may begin its running down movement in a counterclockwise direction when viewed from the front as in FIG. 3. It initially runs down through about half a revolution or 180 degrees to an intermediate position, and the associated cocking spindle 502 of the objective shutter turns through a corresponding extent in the same direction. The control ring 508 of the objective shutter will likewise turn in a counterclockwise direction, carrying its pin 508b with it from the position shown in full lines in FIGS. 8 and 9 to the intermediate position shown in dot dash lines 508x in these views. This motion is assisted by the spring 534. During the counterclockwise rotation of the ring 508, the latch lever 536 mounted on the ring 508 engages the lug 518c of the shutter blade mounting ring 518 and so carries the ring 518 counterclockwise with it, thereby closing the shutter blades 516 which were previously open for viewing. The diaphragm control ring 522 follows along in the same counterclockwise direction under the power of its own spring 528, until it comes into contact with the shoulder 530a of the diaphragm aperture preselector ring 530, thereby closing the diaphragm leaves 519 down to whatever aperture has been previously selected.

During this preliminary part of the running down movement of the spindles 430 and 502, other movements take place within the camera body. The operating cam elements 430c and 430d on the spindle 430 turn the control levers 452 and 456 in a counterclockwise direction. The movement of the control lever 456 swings the left end 456a thereof out of the way of the pin 458a of the latching lever 458, so that the spring 460 can swing the latching lever clockwise on its pivot 452, to move the lever out of the way of the portion 452d of the slide 425, so that the slide is freed for a downward movement. This enables the pivoting spring 422 (more powerful than the spring 428) to swing the mirror carrier 424 and its mirror 426 upwardly from observation position to an approximately horizontal viewing position, which could not be done before the slide 425 moved downwardly because of the pin 425a on this slide engaging the slot in the mirror carrier.

Concomitantly with the upward swinging of the mirror 426, the downward movement of the slide 425 causes a counterclockwise swinging of the control lever 436 on its pivot 450, thereby swinging the latching hook 436b of this lever into the path of travel of the nose 434aa of the control disk 434. Since the control disk is fixed to the spindle 430, the engagement of the hook 436b with the nose of the control disk serves to stop the running down motion of the spindle 430 at the desired intermediate point. This intermediate point is not reached until the control ring 508 of the objective shutter has meanwhile moved far enough to close the objective shutter blades 516, preventing further passage of light into the camera.

Right at the commencement of the running down movement of the cocking spindle 430, the movement of the pin 430e thereon closes the switch 666, the associated switch 668 remaining closed at this time because the lever 402 does not move at this time away from its rest position. The closing of the switch 666 operates the switching transistor 600 to make it conductive, and it remains conductive until completion of the operating functions of the electrical arrangement. As a result of the transistor 600 becoming conductive, the power of the battery 664 is applied to the circuitry. Since the transistors 608, 616, 624, and 632 are also conductive at this moment, the electromagnets 470, 472, 540, and 548 all become energized at this time, so that their respective armatures are held fast by the magnets.

When the power of the battery 664 is applied to the circuitry as aforesaid, an impulse is applied to the transistor 602 from the capacitor 634, and this transistor is temporarily rendered conductive so that any residual voltage still present on the time determining capacitor 636 of the first switching stage A1 is short-circuited or discharged. The resistor 653 which is in parallel with the capacitor 636 serves to discharge this capacitor during long rest pauses. During the period when this first switching stage A1 is operating, the transistor 610 is also conductive and the time determining capacitor 638 of the second switching stage A2 is thereby completely discharged. The transistors 618 of the third switching stage A3 and 626 of the fourth switching stage A4 similarly initiate complete discharge of the respective capacitors 640 and 642. This means for discharging the time-determining capacitors of the four switching stages serves to provide an exact reproduction, at each successive operation, of the desired electronic time delay characteristics of each of the switching stages, thus insuring the required accuracy of the time delay periods of the electronic circuitry as a whole.

During the operating cycle of the first switching stage A1, the capacitor 636 is charged from its completely discharged condition through the time determing resistor 652, until the break voltage of the capacitor 636 is reached. When this voltage is reached, the first switching stage is tripped and the transistor 604, previously blocked or non-conductive, becomes conductive, while the associated transistors 606, and 608 become blocked. This cuts off the current supply to the holding magnet 470, as will become apparent from studying the wiring diagram, so that the magnet 470 becomes de-energized and its armature 470a drops away, and the latching lever 468 controlled thereby swings in a counterclockwise direction, releasing the projection 30s on the opening slide 30 of the focal plane shutter so that the opening slides 30 and 32 are free to run down, which they do under the action of their respective springs. The focal plane shutter is thereby opened. The time determining resistor 652 in this first switching stage is so chosen that the blades of the objective shutter are fully closed and the reflex mirror is fully swung up to picture taking position by the time that the switching stage A1 is tripped to de-energize the magnet 470.

When the first switching stage A1 is tripped, the transistor 610 of the second stage A2 becomes blocked again so that the short circuit of the capacitor 638 ceases and this capacitor is charged through the time determining resistor 654, until the voltage on the capacitor 638 reaches the break voltage. As already mentioned, this will be a very short charging time of only a few milliseconds when the resistor 654 and its control 655 are set for "O" operation of the shutter, but will be a long interval of about 10 or 15 seconds when the parts are set for "V" operation to permit the photographer to place himself in front of the camera after he trips the camera to start the exposure cycle. When the break voltage on the capacitor 638 is reached, this trips the second switching stage A2, so that the previously blocked transistor 612 becomes conductive and the previously conductive transistors 614 and 616 become blocked, thereby cutting off the current flow through the holding electromagnet 548 in the objective shutter. The armature 550 (FIG. 9) of this electromagnet therefore drops away from the magnet and the lever 558 moves the latching lever 524 to the unlatching position. The main driving member or master member 512 of the objective shutter, now unlatched, runs down in a counterclockwise direction under the action of its main spring 514, and the pawl 526 moves the blade driving ring 520 in a counterclockwise direction to open the shutter blades. When the blades reach fully open position, the nose 512c on the master member 512 engages the projection 544b (FIG. 8) of the latching lever 544, temporarily stopping the running down motion of the master member with the objective shutter blades fully open. Exposure of the film through the opened objective shutter now commences, it being remembered that the focal plane shutter is also fully open since the opening slides 30 and 32 have previously moved down to their open positions, while the closing slides 34 and 36 are still held up in their open positions by the latch 478 controlled by the electromagnet 472. In this open position of the objective shutter blades, the flash contact 718 within the objective shutter is closed, for example by an appropriate part of the driving member 512 itself (as well understood in the art), so that if a flashlamp 712 of the "X" type has been properly connected to the camera, the flash will be fired while the blades of both shutters are fully open.

When the second switching stage A2 is tripped, the transistor 618 of the third stage becomes blocked and the capacitor 640 of the third stage begins to be charged through the time-determining resistor 658 previously adjusted manually to set the desired exposure time or shutter speed, although if desired both of the resistors 658 and 656, could be replaced by photo-resistors if it is preferred to have the shutter speed set automatically in accordance with prevailing light conditions. In either event, when the capacitor 640 is charged up to the break voltage, the third switching stage A3 is triggered, the previously blocked transistor 620 becomes conductive, and the transistors 622 and 624, previously conductive, now become blocked. This cuts off the supply of current to the holding electromagnet 540 in the objective shutter, so that the armature 542 drops away, the latching lever 544 moves counterclockwise to unlatching position, and the driving disk or master member 512 can now continue in the counterclockwise direction. This moves the pawl 526 and the blade driving ring 520 in a clockwise direction, closing the objective shutter blades 516. The exposure through the objective shutter is thereby terminated, although the slides of the focal plane shutter are still held open at this time.

With the triggering of the third switching stage A3, the transistor 626 of the fourth switching stage A4 becomes blocked, so that the capacitor 642 of the fourth stage begins to be charged through the time-determining resistance 662, until the break voltage is reached and the fourth switching stage is tripped. This tripping causes the previously blocked transistor 628 of the fourth stage to become conductive, and the transistors 630 and 632 to become blocked, so that the holding electromagnet 472 of the focal plane shutter becomes de-energized and releases its armature 472a. The latching lever 478 therefore releases the pin 134c of the first closing slide 34 of the focal plane shutter, so that the two slides 34 and 36 of the closing system run down and close the focal plane shutter. The tripping of the fourth switching stage A4 serves, as above stated, to block both of the transistors 630 and 632, and the blocking of the transistor 630 has the effect of blocking the switching transistor 600 also, so that the connection between the current source and the complete electronic circuitry is now interrupted and the electronic phase of the shutter operation is now completed. The remaining movements necessary to restore all parts to rest position are completed by mechanical controls rather than electronic controls.

In the final phase of the closing movement of the focal plane shutter, the wedge shaped projection 134k (FIGS. 5 and 7) on the closing slide assembly 34, 134 engages behind the arm 440aa of the wiper 440 and swings the latter forwardly against the action of its spring 442, thus swinging the latching arm 440b (FIG. 6) out of the path of the latching lever 416. This allows the arm 416 and its pin 416a to swing downwardly (clockwise when viewed as in FIG. 6) under the influence of the spring 422, thereby relaxing to some extent the tension of the spring 422 so that it now becomes weaker than the spring 428 (FIG. 3) rather than stronger as was previously the case when the arm 416 and pin 416a were held by the latch 440b. The spring 428 therefore swings the mirror carrier 424 and the mirror 426 downwardly from their approximately horizontal picture taking position (not illustrated) to the viewing position illustrated in FIGS. 5 and 6. This downward motion of the mirror, through the pin and slot connection 424bb and 425a, moves the slide 425 upwardly and it again becomes latched in its upper position by the latch 458 which holds the slide up and thereby holds the mirror down in viewing position against the force of the spring 422 when the latter is once more tensioned to make it stronger than the spring 428, as described below. During the above mentioned downward swinging of the arm 416 (when the latch arm 440b is released) the pin 416a travels down the arcuate slot 414a of the lever 414, which slot is long enough to allow this movement.

The upward movement of the slide 425, during the downward swinging of the mirror to observation position, brings the forwardly projecting portion of the slide up against the lower edge of the lever 466, raising this lever against the force of its spring 472 and correspondingly turning the latch lever 468 resiliently coupled to the lever 466. This applies the armature 470a against the de-energized magnet 470, and brings the latching end 468a into a position in which it will be able to latch the slides of the focal plane shutter when they are moved to their cocked or tensioned position. Also, the same upward movement of the slide 425 serves, through the pin and slot connection 425c and 436a, to swing the control lever 436 upwardly or clockwise on its pivot 450, releasing the nose 436b thereof from the shoulder on the control disk 434 with which it was previously engaged. It will be remembered that it was this control lever 436 which stopped the running down movement of the spindle 430 in an intermediate position. Now that the control lever is unlatched from the control disk, the spindle 430 may continue its running down motion in a counterclockwise direction when viewed from the front as in FIG. 3, from the intermediate position in which it was stopped to the final or rest position. The spindle 502 in the objective shutter turns with it, through the final part of its motion. The rest or end position is determined, in the camera, by a suitable part on the spindle 430 striking against a suitable abutment (not shown). The end or rest position of the parts in the objective shutter is determined by the fact that the pin 508b on the ring 508 strikes against the end of the slot in which it is disposed, this end position being indicated in FIG. 9 by the dotted lines at 508y.

During this final part of the running down movement of the control ring 508 of the objective shutter, from the intermediate pin position 508x to the final pin position 508y, the lever 536 mounted on and moving with the control ring 508 moves to a position where the tail of the lever is engaged by the fixed pin 538 (FIG. 8) thereby turning this lever 536 to release the lug 518c from it. The blade mounting ring 518, upon being relased from the latch lever 536, is drawn back in a clockwise direction by its spring 532, which is still loaded to a sufficient extent for this purpose even though the anchoring pin of the spring has meanwhile been moved to the position 508y. The clockwise motion of the blade mounting ring 518 opens the shutter blades 516 fully, for viewing, since the blade driving ring 520 is now stationary in its final clockwise position. The diaphragm control ring 522 is carried along by the blade mounting ring 518 during the above described clockwise motion thereof, so that the diaphragm leaves 519 are opened to maximum aperture regardless of the aperture which was used during the making of the exposure.

During the above described final part of the running down movement of the spindle 430, the cam portion 430d has acted on the levers 452 and 456 in such a way as to make the latching lever 458 effective once more to assume a position under the nose 425d of the slide 425, to latch this slide in its upper position until the latch is released during the exposure cycle.

The running down cycle of both shutters and of other movable parts within the camera, from their respective cocked or tensioned positions to their respective run down or rest positions, is now complete. The focal plane shutter is closed, all of the slides or blades thereof being in their lowest positions, the viewing mirror is down in its viewing position, and the objective shutter blades and diaphragm leaves are fully open for viewing the image through the lens. Before another picture may be taken, the mechanism must be cocked or tensioned, the action being as follows:

The film 12 is moved through the distance of one picture frame, by operating the feed lever 16. As already explained above, this moves the cocking lever 402 clockwise and the intermediate lever 408 counterclockwise. During the clockwise movement of the lever 402, the left end thereof raises the projection 30s from its rest position to its upper or cocked position, where it is held by the latch member 468a after momentarily deflecting this latch lever against the action of the spring 471 as the projection moves upwardly. During this upward movement of the opening slide parts 30, 130, they carry upward with them, through the same distance, the parts 34, 134 of the closing slide system, and these parts carry up with them, through a lesser distance, the parts 36, 136 of the closing slide system. As the closing slide parts 34, 134 move upwardly, the pin 134c thereof, travelling up in the slot 24d, engages the latch lever 478, and deflects it upwardly against the tension of the spring 480, far enough for the lower arm 478b of this latching lever to pass the slope 134cc of the pin 134c, whereupon the pin 134c comes in contact with the upper arm 478a of the latching lever and comes to rest against it, with the lower edge of the pin resting on the lower arm 478b of the latch. Because of the resilient connection formed by the spring 480 between the levers 474 and 478, this action applies the armature 472a tightly against the electromagnet 472, and allows a slight over travel of the upward motion of the pin 134c without danger of damage to the magnet. Although the magnet 472 is not energized at this time, the pin 134c is in position to be supported by the latch mechanism 474, 478 whenever the magnet 472 is energized, and meanwhile the pin and the associated parts 134, 34 are held in their upper position because they rest on parts of the opening slide mechanism 30, 130 which is held in its upper position by the latch 468. As explained in the above mentioned Singer patent and as will be apparent from a study of FIG. 7, the other shutter slide parts 32, 132 of the opening group and 36, 136 of the closing group are held in their upper or initial positions by suitable portions of the slide parts 30, 130 and 34, 134, respectively.

The above mentioned counterclockwise motion of the intermediate lever 408, during the cocking operation, performs two functions. First, through the pivot 412, it moves the lever 414 approximately vertically upwardly, far enough so that the lower end of the slot 414a thereof engages the pin 416a on the member 416 and swings the lever 416 upwardly or counterclockwise when viewed as in FIG. 6, thereby tensioning the spring 422 again so that it is now again stronger than the spring 428. However, although the spring 422 is now stronger, it cannot swing the mirror 426 upwardly because the mirror is held in its down position by the upper position of the slide 425, which has meanwhile become latched in its upper position by the action of the latch 458. Also, the upward motion of the shutter slide parts 34, 134 has meanwhile moved the wedge 134k upwardly so that it no longer engages the part 440aa of the wiper 440, and thus the wiper spring 442 can swing the wiper latch arm 440b to a position underlying and latching the arm 416 (as shown in FIG. 6) as soon as the upward motion of the lever 414 has moved the arm 416 far enough in a counterclockwise direction for the latch 440b to snap under it.

The second action performed by the intermediate lever 408 during its counterclockwise cocking motion is to cause clockwise turning of the pinion 432 which is driven by the gear teeth of the lever 408. Through the action of the lug 432a on the pinion 432 cooperating with the lug 434a on the control disk 434 of the cocking spindle, the cocking spindle is turned in a clockwise direction from its rest position to its cocked or tensioned position in which it is then held by the latch member 484, the power spring 431 of the cocking spindle meanwhile being loaded or tensioned.

Toward the end of the tensioning movement of the spindle 430, the control levers 452 and 456 can resume their normal positions indicated in FIGS. 3 and 4, under the action of their respective return springs 453 and 462, after being released by the control cams 430c and 430d. The latching pawl 458 thus enters beneath the arm 425a and latches the slide 425. This establishes the mechanical latching of the two armatures 470a and 472a, and the two groups of focal plane shutter slides, this mechanical latching being necessary to hold the elements in cocked condition while the holding magnets are de-energized.

During the clockwise cocking movement of the spindle 430 in the camera, the cocking spindle 502 in the interchangeable objective shutter unit is also turned clockwise, thereby turning the control ring 508 clockwise, through the agency of the pinion 506, from the limit position back to the position where its pin 508b is illustrated in full lines in FIGS. 8 and 9. This loads or tensions the springs 532 and 534, while the rings 518 and 522 do not change position. The lever 536 carried by the ring 508 glides over the nose or lug 518c on the ring 518 and takes up a position in front of this shoulder, ready to carry the ring 518 counterclockwise during the next exposure operation. When a specific angular position of the spindle 502 and pinion 506 are reached during this clockwise tensioning movement, the tooth 506a engages the projection 510a on the spindle 510, and turns this spindle clockwise, carrying with it the main driving disk or master member 512 and tensioning the master spring 514, the member 512 then being held in its cocked position by the latch member 524, as illustrated in FIGS. 8 and 9. As a result of the cocking motion of the ring 508 and of the member 512, the armatures 542a and 550 are applied against their respective electromagnets 540 and 548, which are not energized at this time.

After the film has been fed as above described and the various cocking parts have moved fully through their cocking motions, release of the film feeding lever 16 will permit the parts to return to their rest or starting positions under the action of the return spring 418 (FIG. 1). It is to be noted that the lever 414 can complete this restoring movement since the slot 414a permits the lever 414 to move downwardly again to its initial position, even though the pin 416a remains upward in the tensioned position in which it is latched by the latch part 440b. The various latches have all dropped into their respective holding positions, and the parts remain in cocked or tensioned position until the next exposure is made.

It will be noted from what has been said above that when the camera has been adjusted for making the exposure by means of the objective shutter, both the objective shutter and the focal plane shutter perform their complete respective operating cycles, and the change-over switch or selector switch 670 set by the setting knob 700 causes the electronic control mechanism to apply to the two shutters the phase displacement which is correct for the exposure function which has been selected. In other words, the electronic control mechanism phases the shutters in such a way that the focal plane shutter opens fully before the exposure opening of the objective shutter, and remains fully open until the exposure by the objective shutter has been completed. In this case the switching stages A1 and A4 of the circuitry serve for the application of delay periods which are sufficient for the performance of the functioning of the mirror properly timed before the commencement of the functions of the first shutter and the ending of the functions of the first shutter after the second shutter has run down. The other switching stages A2 and A3 serve for those delay periods which are necessary during the opening of the first shutter or for self portraits (when set to "V") and for termination of the exposure time or shutter speed.

The interchangeable objective shutter is usually used when flash light photographs are to be taken, because it is possible to synchronize this shutter with electronic flash apparatus down to a very short exposure time or fast shutter speed. On the other hand, when a daylight photograph is to be taken, the photographer will usually but not necessarily prefer to make the photograph by means of the focal plane shutter. For this purpose the setting knob 700 will be turned from the position shown in FIG. 12 to the position shown in FIG. 13. This brings the various switches 672, 674, 676, 678, 680, 682, and 714 from their positions shown in full lines to their positions shown in broken lines in the wiring diagram. This causes the electronic circuitry to control the holding magnets 470, 472, 540, and 548 in a different switching sequence, and makes the resistors 656 and 660 effective, in place of the respective resistors 658 and 662. Also, the circuit of the flash apparatus 712 (if one is used) will now be closed by the contact 716, operated by a part of the focal plane shutter when the latter reaches its fully open position, rather than by the contact 714 closed by the objective shutter when it reaches open position. Consequently, flash apparatus can still be used, if desired, even when the focal plane shutter is being used for the exposure.

When the electronic circuitry is thus set for use of the focal plane shutter, it functions in exactly the same way as has been explained above, except that the sequence or timing is different. It is only necessary to mention that when the first switching stage A1 is tripped, instead of de-energizing the magnet 470 to start the running down of the focal plane shutter, it de-energizes the magnet 548 to trip the objective shutter so that this shutter will open and will be kept in its open position by the latching arm 544b since the magnet 540 is still energized.

Then when the second switching stage A2 is tripped, current will be cut off from the electromagnet 470 so that the opening movement of the focal plane shutter will commence, and the opening slides 30 and 32 of the focal plane shutter will run down to the open position. After the required exposure time as determined by the setting of the member 656 (or by a photoresistor if one is used in place of the adjustable resistor 656) the third stage A3 will trip, which will cut off current to the magnet 472, releasing the latch of the closing group of slides or blades of the focal plane shutter, so that the focal plane shutter will close, terminating the exposure. Then when the fourth and last switching stage A4 is tripped, the holding magnet 540 is de-energized, so that the latch 544b moves aside and the driving disk or master member 512 is released and can complete its running down motion, closing the objective shutter blades. The reflex mirror moves back to its viewing position, the cocking spindle 430 completes its final movement from its intermediate position to its end or rest position, and the diaphragm leaves and shutter blades of the objective shutter are re-opened for viewing. The electronic circuitry becomes disconnected from the battery 664 after the last switching stage A4 has been tripped, so the camera achieves its rest or run-down condition. It will be noted that the setter 655 and associated resistor 654 can be set to the "V" position no matter which shutter is to be used for the exposure, so that an initial delay for self portraiture is possible just as well with the focal plane shutter as with the objective shutter.

The use of a "normal" or "simple" objective unit, containing only a lens but without any objective shutter, has already been mentioned. When this is done, the interlocking parts insure that the change-over switch is in position for exposure by the focal plane shutter, as already explained. It will be noted that this does not interfere in any way with the exposure cycle above explained. The switching stages will function just as before mentioned, when set for focal plane shutter operation. The same impulses in the electronic circuitry will occur, in the same timed sequence. Since the electromagnets 540 and 548 will not be present when there is no objective shutter mounted on the camera, the current supply circuits going to these magnets in the wiring diagram will simply be ineffective without altering the sequence of operation and the proper timing of other parts of the circuitry.

What is claimed is:

1. A photographic camera having both a focal plane shutter and an objective shutter, electronic circuit means for controlling opening and closing movements of both shutters, a selector member movable between two positions for respectively selecting the focal plane shutter or the objective shutter for effective exposure operation, and switching means operatively connected to said selector member, said switching means being effective when said selector member is in one position to set said electronic circuit means so that said focal plane shutter will open before and close after exposure-making operation of said objective shutter and when in another position to set said electronic circuit means so that said objective shutter will open before and close after exposure-making operation of said focal plane shutter, both of said shutters completing their full individual operating cycles regardless of which shutter is selected for making the exposure.

2. A camera as defined in claim 1, in which said objective shutter is in an interchangeable objective unit detachably mounted on a body portion of the camera.

3. A camera as defined in claim 2, in which said objective unit containing an objective shutter may be replaced on the camera body by a simple objective unit without a shutter, said camera body portion and said simple unit having cooperating interlocking means to prevent said selector member from being moved from focal plane shutter selecting position to objective shutter selecting position so long as said simple objective unit remains mounted in effective position on said camera body portion.

4. A camera as defined in claim 3, in which said interlocking means includes means for moving said selector member from objective shutter selecting position to focal plane shutter selecting position by the act of mounting said simple objective unit on the camera body portion, if it is attempted so to mount said simple unit while said selector member is in objective shutter selecting position.

5. A camera as defined in claim 2, in which the electronic circuit means includes a plurality of Schmitt-trigger devices equipped with RC-members and includes holding electromagnets having armatures which constitute function blocking means for individual operating cycles of the two shutters, the holding magnets (540, 548) of the interchangeable objective shutter being arranged within the shutter and being conductively connected with the remainder of the electronic circuit means within the camera body portion by releasable contacts (K1, K2).

6. A camera as defined in claim 5, in which the camera is a single lens mirror reflex camera with a mirror swingable between a picture taking position and a viewing position, and in which the parts are so arranged that prior to initiation of an exposure cycle said mirror is in viewing position and said focal plane shutter is closed and said objective shutter is open, and that during an exposure cycle said mirror is shifted to picture taking position and both of the shutters perform a running down cycle from their respective positions mentioned.

7. A camera as defined in claim 5, wherein said electronic circuit means includes four different delay switching stages (A1, A2, A3, A4) with a Schmitt-trigger device in each stage, the first and fourth switching stages determining a preliminary delay and a terminal delay, respectively, the second switching stage determining a delay during the opening of the first shutter or for a self portrait, and the third switching stage determining a delay which controls the duration of exposure.

8. A camera as defined in claim 7, in which the first switching stage starts to operate near the beginning of an exposure cycle, and operation of each switching stage initiates the operation of the next succeeding switching stage.

9. A camera as defined in claim 1, further including a flash circuit having a flash switch for actuating a flash when an exposure is made by the focal plane shutter and a different flash switch for actuating a flash when an exposure is made by the objective shutter, said switching means connected to said selector member being effective to determine which of said flash switches will be effective.

10. A photographic camera comprising a focal plane shutter, an objective shutter, a first electromagnetic element effective upon predetermined alteration of its magnetic state to initiate an opening movement of said focal plane shutter, a second electromagnetic element effective upon predetermined alteration of its magnetic state to initiate an opening movement of said objective shutter, a third electromagnetic element effective upon predetermined alteration of its magnetic state to initiate a closing movement of said objective shutter, a fourth electromagnetic element effective upon predetermined alteration of its magnetic state to initiate a closing movement of said focal plane shutter, electric circuit means for causing predetermined alteration of the respective magnetic states of said four elements in timed sequence, and change-over switch means selectively settable to cause said electric circuit means to alter the magnetic states of said elements in either one of two sequential orders, said switch means in one setting causing said circuit means to cause said predetermined alteration of the first, second, third, and fourth elements in timed sequence in that order when an exposure is to be made by said objective shutter, said switch means in another setting causing said circuit means to cause said predetermined alteration of the second, first, fourth, and third elements in timed sequence in that order when an exposure is to be made by said focal plane shutter.

11. A camera as defined in claim 10, in which said electric circuit means includes four trippable switching stages arranged in predetermined sequence with each subsequent stage tripped by operation of the next preceding stage, and in which said switching stages are operatively connected to said four electromagnetic elements in a respective sequence determined by the setting of said change-over switch means.

12. A camera as defined in claim 10, in which said predetermined alteration of the magnetic state of each electromagnetic element, effective to cause initiation of the specified movement of its associated shutter, is alteration from an energized magnetic state to a de-energized non-magnetic state.

13. A camera as defined in claim 12, in which said electric circuit means includes four trigger stages arranged in sequence and each including Schmitt trigger means, the stages being interconnected to each other in such manner that each stage after the first one is triggered by operation of the next preceding stage, said circuit means initially energizing all of said elements to a magnetic state, operation of said stages serving to de-energize said elements one by one successively in timed relation to each other.

* * * * *